(12) United States Patent
Zrodowski

(10) Patent No.: US 11,938,557 B2
(45) Date of Patent: Mar. 26, 2024

(54) SONOTRODE FOR PROCESSING OF LIQUID METALS AND A METHOD FOR PROCESSING OF LIQUID METALS

(71) Applicant: Lukasz Zrodowski, Gdansk (PL)

(72) Inventor: Lukasz Zrodowski, Gdansk (PL)

( * ) Notice: Subject to any disclaimer, the term of this patent is extended or adjusted under 35 U.S.C. 154(b) by 193 days.

(21) Appl. No.: 17/609,941

(22) PCT Filed: May 12, 2020

(86) PCT No.: PCT/IB2020/054490
§ 371 (c)(1),
(2) Date: Nov. 9, 2021

(87) PCT Pub. No.: WO2020/230027
PCT Pub. Date: Nov. 19, 2020

(65) Prior Publication Data
US 2022/0161353 A1 May 26, 2022

(30) Foreign Application Priority Data

May 13, 2019 (PL) .......................................... 429907

(51) Int. Cl.
*B23K 20/00* (2006.01)
*B06B 3/00* (2006.01)
(Continued)

(52) U.S. Cl.
CPC .............. *B23K 20/106* (2013.01); *B06B 3/00* (2013.01); *B23K 20/26* (2013.01); *B23K 37/003* (2013.01); *B06B 2201/77* (2013.01)

(58) Field of Classification Search
CPC ........ B23K 20/106; B23K 20/10; B23K 1/06; B23K 3/0661; B23K 20/1255; B23K 20/26
See application file for complete search history.

(56) References Cited

U.S. PATENT DOCUMENTS 3,833,163 A 9/1974 Denslow et al.
5,772,100 A 6/1998 Patrikios
(Continued)

FOREIGN PATENT DOCUMENTS

CN 1422718 A 6/2003
DE 2732616 A1 2/1979
(Continued)

*Primary Examiner* — Erin B Saad
(74) *Attorney, Agent, or Firm* — BROWDY AND NEIMARK, P.L.L.C.

(57) ABSTRACT

An ultrasound sonotrode (101), the first end of which is adapted to be connected to a mechanical vibrations source, equipped with a working tip (105,205,405,805) at the opposite end of the sonotrode (101), equipped with a body (104) with a cooling jacket (103), sealed at the place of contact with the body (104) of the sonotrode (101) with the use of the first seal (106) and the second seal (107), characterized in that according to the invention the first seal (106) is placed at a distance less than or equal to 20 mm from the node of the standing wave excited in the sonotrode in the working conditions, and the second seal (107,207,407,507,607) is equipped with a resilient element (108,208,408,508,608) and is located at a distance less than or equal to 20 mm from the working tip (105,205,405,805). A method for metal alloying, in which the material is melted on the working tip (105, 205, 405, 805) of the sonotrode excited to mechanical vibrations, according to the invention characterized in that a sonotrode according to the invention is used.

15 Claims, 6 Drawing Sheets

Figure 1A:
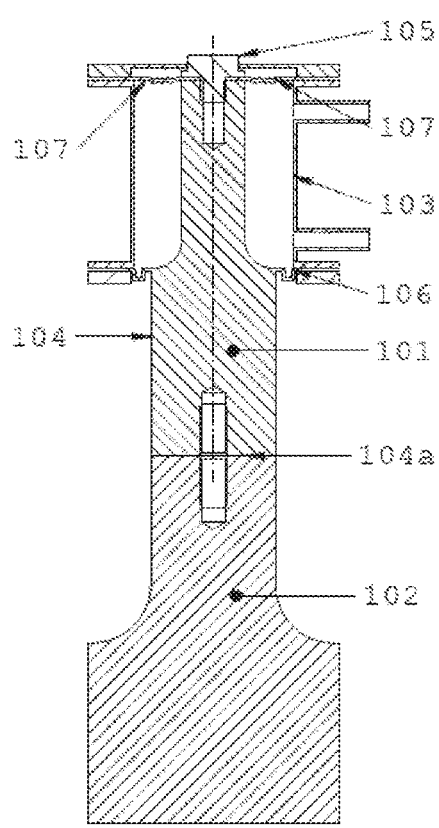

(51) Int. Cl.
*B23K 20/10* (2006.01)
*B23K 20/26* (2006.01)
*B23K 37/00* (2006.01)

(56) References Cited

U.S. PATENT DOCUMENTS

| | | | |
|---|---|---|---|
| 10,052,714 B2* | 8/2018 | Massa | B23K 20/106 |
| 11,011,492 B2* | 5/2021 | DeAngelis | H01L 24/78 |
| 2012/0236067 A1* | 9/2012 | Tajima | B41J 2/1645 |
| | | | 118/704 |
| 2019/0001440 A1* | 1/2019 | Zrodowski | B22F 10/28 |
| 2021/0168944 A1* | 6/2021 | Baftiri | H05K 1/185 |

FOREIGN PATENT DOCUMENTS

| | | |
|---|---|---|
| EP | 2709726 A1 | 3/2014 |
| GB | 1594977 A | 8/1981 |
| PL | 423408 A1 | 5/2019 |
| WO | 2006036036 A1 | 4/2006 |

\* cited by examiner

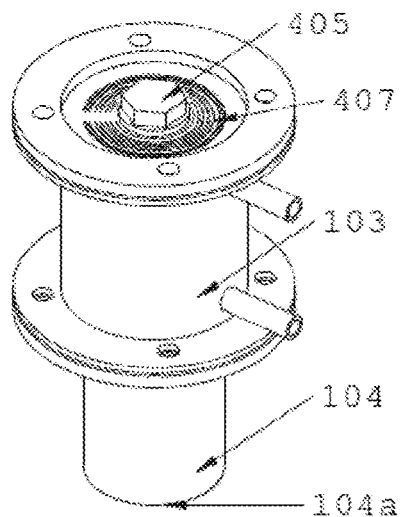
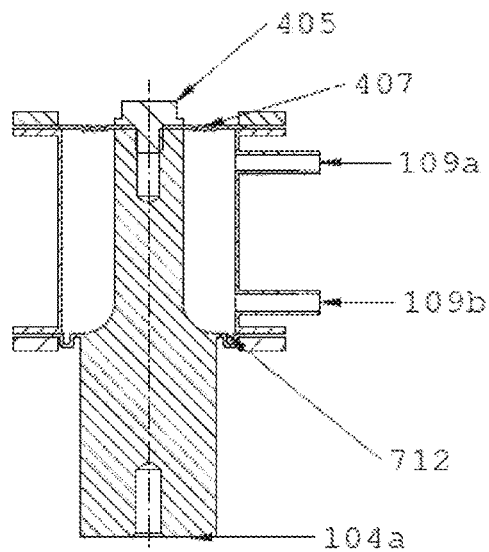
Fig. 4a
Fig. 4b
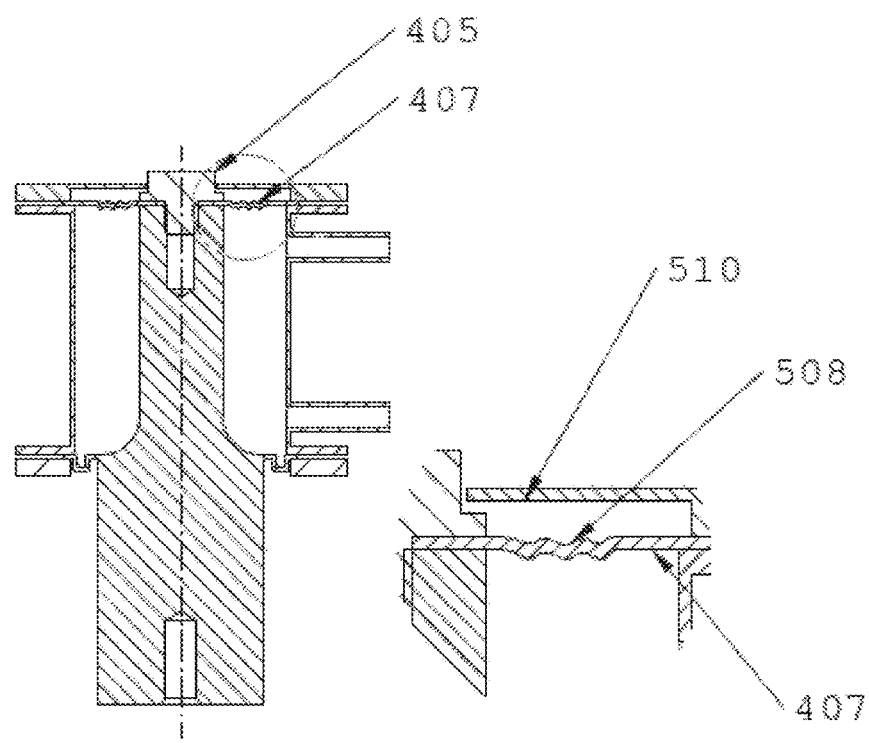
Fig. 5

SONOTRODE FOR PROCESSING OF LIQUID METALS AND A METHOD FOR PROCESSING OF LIQUID METALS

Present invention concerns a sonotrode, particularly an ultrasound sonotrode adapted to transfer mechanical vibrations to liquid metals. Present invention also concerns a method for ultrasound assisted metal alloying.

As per state of the art, ultrasound frequency vibrations are used in processing of liquid metals. Typical applications of the method are atomization and alloying. Typically, an ultrasound system is agitated by a piezoelectric or a magnetostrictive transducer. Due to the fact that the upper working temperature limit of these transducers is by far lower than the melting temperature of most metals, the ultrasound system requires a high efficiency cooling system to be applied, e.g. a flowing or sprayed liquid or gas flow.

For the ultrasonic process to occur in a stable manner, it is required for the sonotrode to maintain good wettability in respect to the liquid metal and maintaining the temperature of the sonotrode surface above the melting point of the processed alloy. Due to the limit on the working temperature of the piezoelectric transducer, a high temperature gradient is created, which leads to the short working time of the sonotrode. At the same time, due to material limitations and high fatigue loads, the phenomenon results in a limitation of the maximum working temperature to approximately 700° C.

One of the applications of ultrasound frequency vibrations is the atomization of liquid metals. An ultrasound atomizer with a cooling system for a sonotrode-vibration system is known form a Chinese patent CN1422718. Liquid metal is in direct contact with the vibrating sonotrode, which sprays the liquid alloy, droplets of which undergo solidification in the form of powder. The part of the system containing piezoceramics is air cooled and the sonotrode is independently cooled with water or air, which assures the two active cooling steps to be present. A disadvantage of this approach is the low thermal resistance, i.e. for temperatures above 700° C. and highly variable frequency due to the contact with liquid metal. The sonotrode is cooled only above ¼λ (standing mechanical wave length) from the working tip.

Another method for maintaining thermal stability of the vibrating components used in ultrasound atomization is to use a cooling coil as described in U.S. Pat. No. 2,889,580. A disadvantage of the method are the high mechanical losses at the border between the cooling coil and the vibrating component due to friction.

Another application using ultrasound agitation of metals is ultrasound-assisted soldering. An American patent document U.S. Pat. No. 3,833,163 describes a method for the agitation of liquid metal through the application of an ultrasound system consisting of metals with high and low thermal conductivity. Material in direct contact with the hot components is made of titanium with low thermal conductivity. It is then connected to a radiator made of aluminum with high thermal conductivity. The combination of these two materials allows for the limitation of effective heat transfer from the liquid metal to the transducer and acceleration of heat dissipation. This solution cannot, however, be applied when the medium temperature exceeds sonotrode working temperature.

The British patent document GB1594977 describes a cooling system for a sonotrode for the homogenization of liquid metal. Waveguide (booster) is cooled by a water jacket near the standing wave node. A similar method was disclosed in an American patent document U.S. Pat. No. 376,236, which describes an use of a water-cooled system to preserve thermal stability of a sonotrode working in liquid solder. Vibrating components are surrounded by a water jacket and their seals are placed in standing wave nodes. In both cases, sonotrode cooling system is located at least ¼λ from the sonotrode front and the solution cannot be used for materials with a working temperature higher than 700° C.

In general, a significant disadvantage of liquid cooling methods in the state of the art is susceptibility to mechanical damage (fracture) of the sonotrode due to the lowering of fatigue strength of the material in high temperatures and significant susceptibility of the coolant system seals to vibrations transferred via the sonotrode. The second problem was partially solved in a Polish patent application no. P.423408. The invention pertains to an ultrasound system dedicated to work in elevated temperatures. The sonotrode was made of a material with high thermal conductivity, preferably of a copper alloy—CuCrZr, CuBe, or tungsten sinters. The sonotrode was connected to an additional waveguide and seals were used in direct vicinity of nodes of the standing wave excited in the sonotrode in its working conditions. Thanks to this solution, the influence of vibrations in the longitudinal direction on the seal was eliminated and a possibility of using a reliable sealing system, practically stationary in relation to the sonotrode is ensured. A disadvantage of the sonotrode according to the application P.423408 is its susceptibility to mechanical damage, particularly in long term use. This prevents the use of a high amplitude amplification and limits the sonotrode working temperature. Additionally, the sonotrode requires the use of materials with high thermal conductivity and lower mechanical properties than those of materials typically used for ultrasound components.

In an American patent document U.S. Pat. No. 5,772,100, a sonotrode mounting with two fastening elements is described. The first fastening element is located in the wave antinode (at the point of contact with the transducer) and the second in the wave node (half of sonotrode length). The working tip is located ¼ wave length from the body.

The purpose of the invention is to solve the problem of sonotrode susceptibility to mechanical damage and to provide a reliable sonotrode for liquid material processing and a method of processing liquid metals.

A sonotrode the first end of which is adapted to be connected to the source of mechanical vibrations, equipped with a working tip on the opposite end of the sonotrode and a body in which ultrasound vibrations are excited, fitted with a cooling jacket sealed at the point of contact with the body with the first and second seals according to the invention is characterized in that the first seal is at a distance equal to or less than 20 mm from the standing wave node in the sonotrode excited in the working temperature. Sonotrode working temperature depends on the melting temperature of the processed material and cooling system efficiency. The second seal is equipped with a resilient element and is no further than 20 mm from the sonotrode working tip. Due to this configuration, the sonotrode is effectively cooled before the first standing wave node from the working tip. This solves the problem indicated in the state of the art, as the inventor has noticed, the susceptibility of sonotrodes as per state of the art to damage was due to the fact that maximum mechanical stress occurred in the wave node in which the sonotrode as per the state of the art was cooled. As a result, ensuring cooling of the system just at the wave node location increases the risk of damage. A solution according to the invention requires the use of sealing close to the maximum vibration amplitude, and, in consequence, the necessity of using an additional resilient element. Moreover, a seal close to the working tip needs to be frequently replaced and treated as a consumable component.

Advantageously, the working tip is the working surface of the sonotrode.

Alternatively, the working tip is the component, separately connected to the sonotrode. Therefore, the body of the sonotrode is not a consumable component—but the tip is. It can be replaced along with the second seal. The working tip can be made of a different material than the body of the sonotrode.

Advantageously, the sonotrode is fitted with an additional cover of the second seal. Due to the extreme conditions on the working surface, the second seal is susceptible to thermal damage and liquid metal spray. This problem is limited by the use of a shield made from a metal alloy and placed close to the seal. The use of the additional shield allows for the anticipated service time to be adapted to the working tip service time.

Advantageously, the second seal is a polymer seal integrated with a metal resilient element. The solution allows for the seal to be placed directly on the sonotrode body without additional compression of the seal. In another advantageous embodiment of the invention the second seal is compressed by two plates with a thickness lower than 1 mm.

Alternatively, the second seal is the diaphragm, connected to the working tip. Preferably, diaphragm is made of a material with thermal conductivity above 100 W/mK and preferably also electrical conductivity above 20% IACS, and has a stiffness equal to or lower than 10 kN/mm in the axial direction of the ultrasound system. Too stiff diaphragm couples vibrations to cover of cooling system. Due to usage of material with electrical conductivity above 20% IACS heating of the diaphragm has minor effect for its mechanical properties.

Advantageously, the first seal is an elastomer o-ring.

Advantageously, the body of the sonotrode is equipped with a resilient flange at the first seal.

A method for metal processing in which the metal is melted on the working surface of the sonotrode, excited to mechanical vibrations and characterized in that the sonotrode is used as per any of the claims from 1 to 9.

Advantageously, mechanical vibrations within the frequency range of 16 to 400 kHz are used. Frequencies in this range are useful for the processing of metals and the mechanical vibration sources are quite easily available. In these frequency ranges, dimensions are easily scaled.

Advantageously, during the melting, the sonotrode is placed in a vacuum chamber filled with argon.

Advantageously, melting is effected with electrical current flows. Advantageously, electrical current flows through a second seal, which is a diaphragm.

Advantageously, ethylene glycol is used as a cooling fluid for the sonotrode.

Advantageously, a mixture of ethylene glycol and water is used as the cooling fluid.

In another advantageous embodiment of the invention the second seal is compressed with two plates with a thickness below 1 mm. In another preferable embodiment of the invention the second seal is made of polymer or metal diaphragm compressed by the working tip.

The subject of the present invention is shown in embodiments—

Figure 1B:
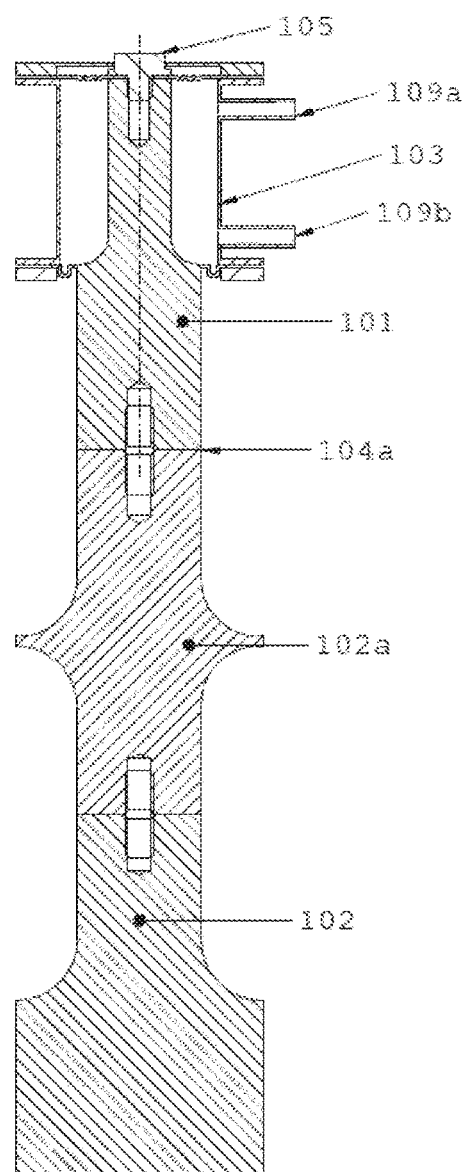
Figures 2A, 2B:
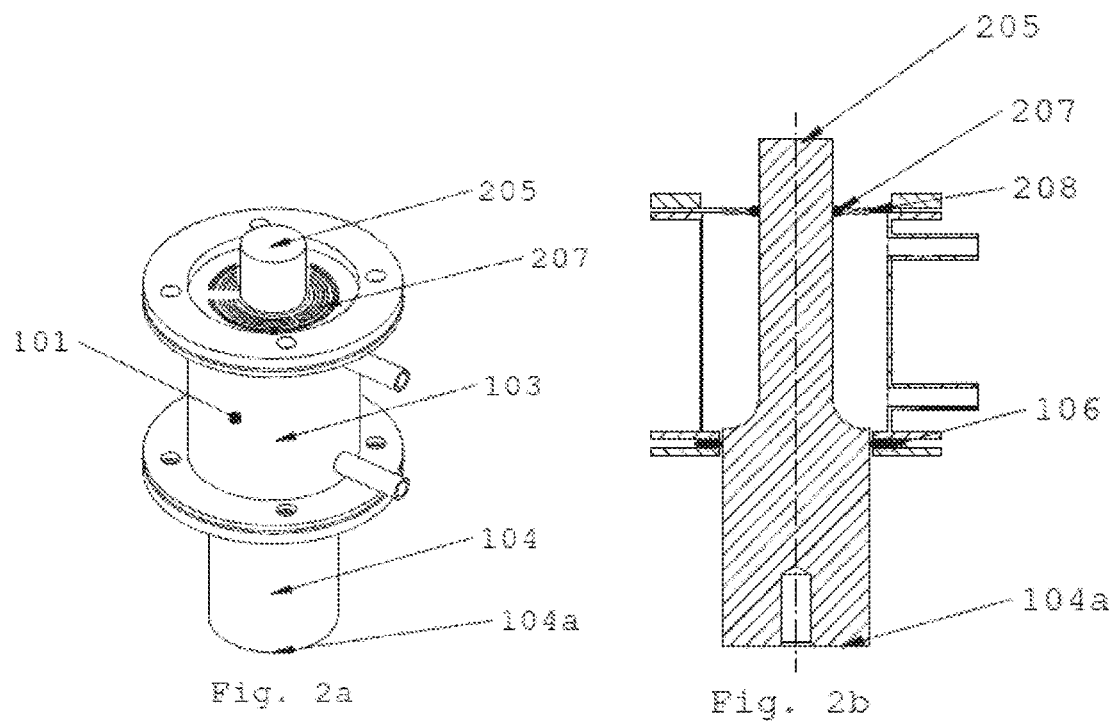
Figure 3:
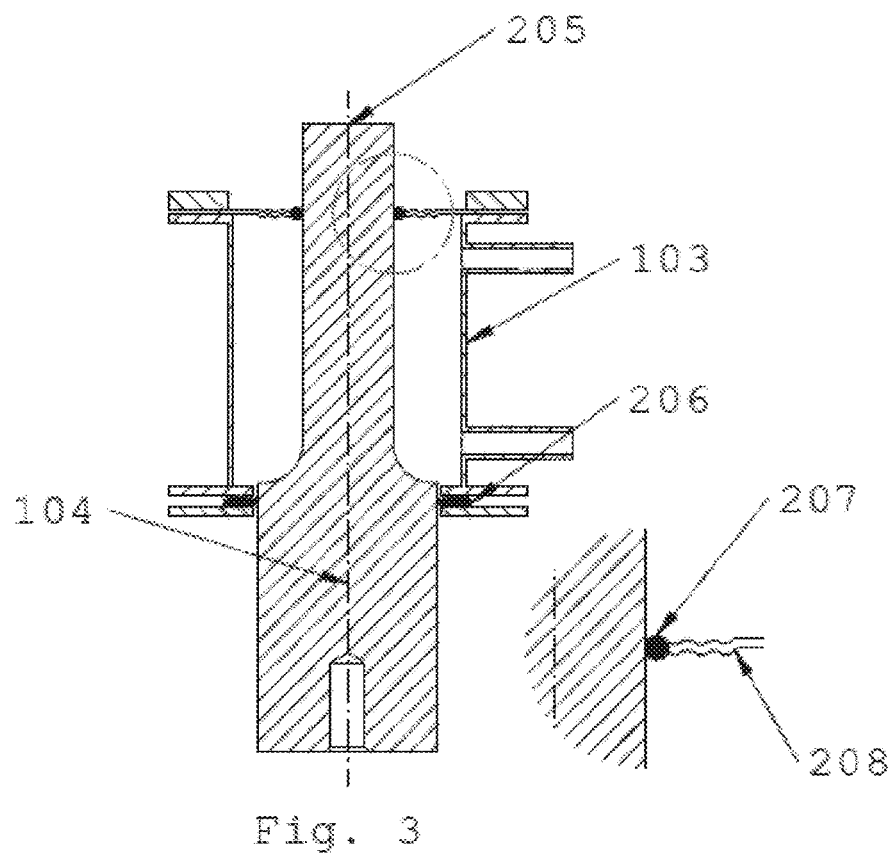
Figure 6:
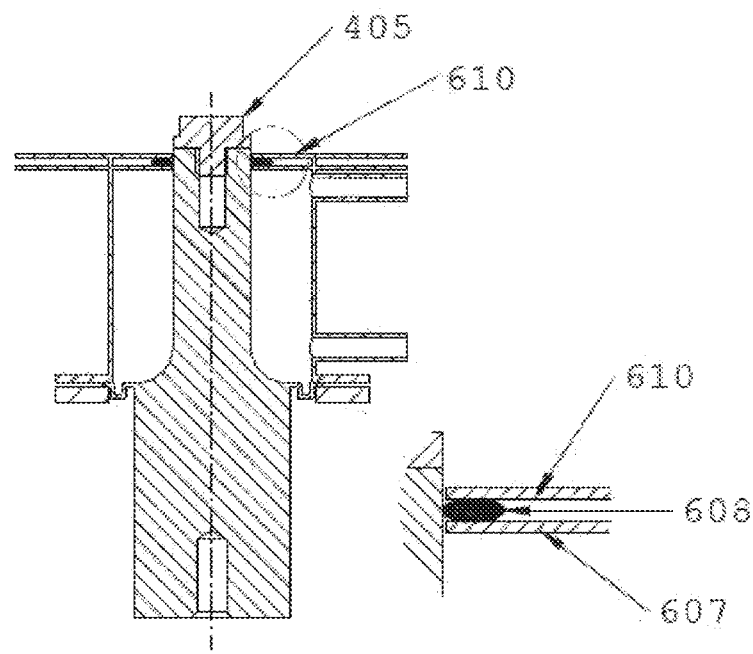
Figure 7A:
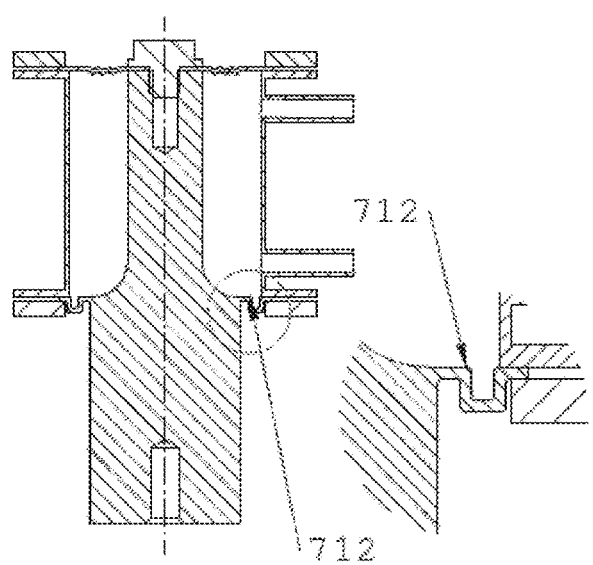
Figure 7B:
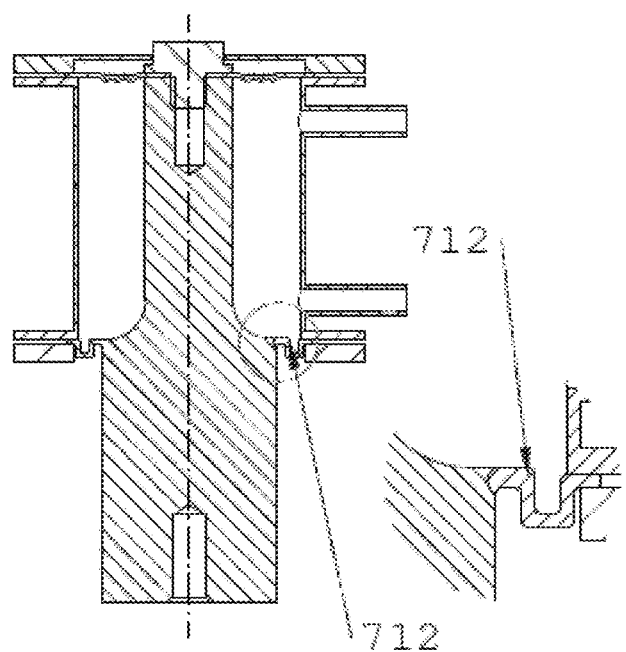
Figure 7C:
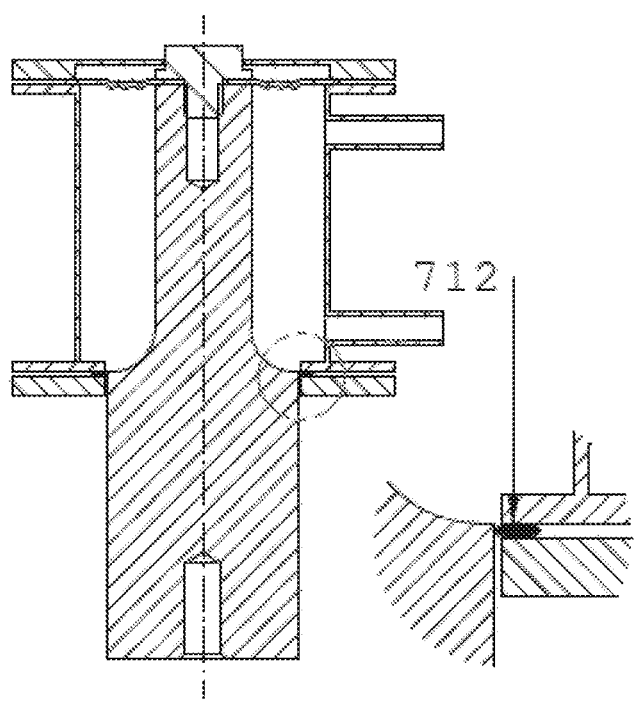
Figure 8:
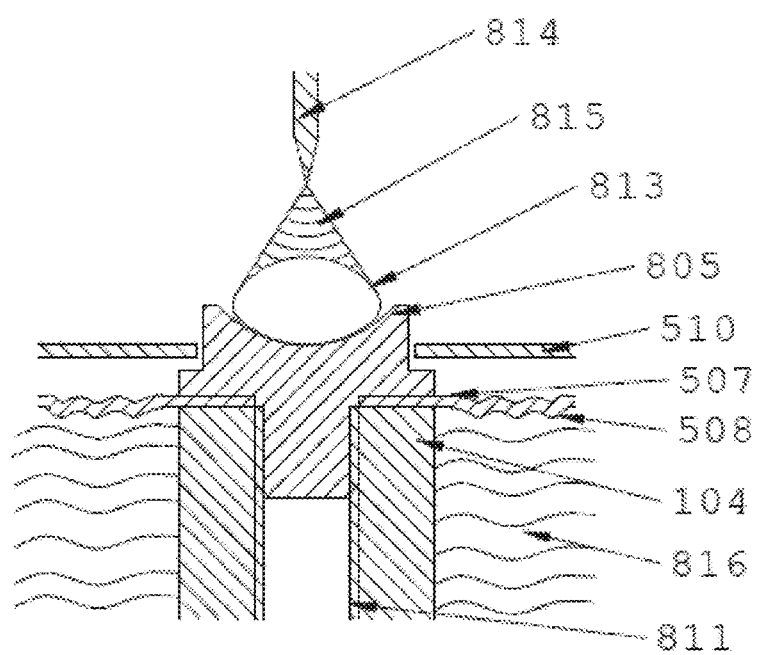

FIG. 1*a* shows an ultrasound system, a part of which is a sonotrode according to the invention with a transducer directly connected to the sonotrode, FIG. 1*b* shows an ultrasound system, a part of which is a sonotrode according to the invention with a transducer connected to the sonotrode through a waveguide, FIG. 2*a* shows a sonotrode according to the first embodiment of the invention in a perspective, FIG. 2*b* shows a sonotrode according to the first embodiment of the invention in a longitudinal section, FIG. 3 shows a magnification of second seal in the first embodiment, FIG. 4*a* shows a sonotrode according to the second embodiment in a perspective, FIG. 4*b* shows a sonotrode according to the second embodiment in a longitudinal section, FIG. 5 shows a magnification of the second seal in the second embodiment, FIG. 6 shows a magnification of a variation of the second seal in the second embodiment, FIG. 7*a-c* show a magnification of examples of sealing at the wave node, FIG. 8 shows a sonotrode with the working tip during the liquid metal homogenization process.

Sonotrode 101 according to the invention may constitute a part of an ultrasound system for liquid metal homogenization, such as systems shown in FIG. 1*a* and FIG. 1*b*: Sonotrode 101 needs to be connected to an ultrasound source, e.g. transducer 102—directly or through a waveguide 102*a*. In the sonotrode body 104, a standing wave is excited. For this to be possible, body 104 dimensions in the working temperature and transducer 102 frequency should be compatible. The working tip 105 of the sonotrode 101, placed at the opposite side of the sonotrode from the transducer 102, is in direct contact with the liquid metal. The working tip 105 of the sonotrode vibrates due to the vibrations, which results in homogenization of the liquid alloy and ensuring equiaxial grain growth during crystallization.

During the process, the sonotrode requires cooling—it is therefore equipped with a cooling jacket 103, fitted with an inlet 109*a* and an outlet 109*b* of the cooling fluid. The cooling fluid can be a liquid or a gas-liquid colloidal system, e.g. oil mist. The use of an oil mist allows for the energy absorbed during oil evaporation to be used for cooling. Jacket 103 in contact with the body 104 is sealed with the first 106 and second 107 seal. The first seal 106 is placed near the node of the standing wave in the body, so the displacement of the body in relation to the first seal 106 is negligible. The second seal 107 is placed near the antinode of the standing wave in the sonotrode body 104, so it needs to be movable.

Sonotrode body 104 as described in the embodiment below is half-waved, which means that in the working temperature and working frequency 20 kHz on the length from the base 104*a* to the end of the working tip 105, half the length of the sound wave fits. Therefore, there is only one distance value from the base 104*a* along the axis of the body 104, which assures no ultrasound longitudinal vibrations occur during sonotrode excitation. This is the distance in which wave node is located. Base surface 104*a* and working tip 105 surface is located in wave antinodes of the standing wave excited in the body 104. An expert is capable of routinely manufacturing a system with a length which is a multiple of half the standing wave and having similar function. For example, in some cases, integration of sonotrode and waveguide in one element is justified.

A sonotrode according to the first embodiment of the invention is a working element of the ultrasound system containing at least one ultrasound generator and ultrasound transducer working in a nominal frequency of 20 kHz.

The sonotrode is shown in perspective in FIG. 2a and in section in FIG. 2b. A sonotrode according to the embodiment contains a sonotrode body 104, cooling jacket 103, the first seal 106 and a working tip, which is the upper surface 205 of the body 104, and the second seal 207.

The cooling jacket 103 is ensured on a part of the sonotrode body closer to the working tip 205 and sealed with the first polymer seal 106 on which the body is fitted from one side, and on the other side sealed with a second seal 207 with a resilient element 208 near the working surface 205 constituting a working tip of the sonotrode.

Maximum stress in the working sonotrode occurs in its middle at a length of $\lambda/4$ (¼ of standing wave length in the given material-wave node). The sonotrode is fatigue-stressed with a frequency corresponding to the frequency of the ultrasound system. Stress in the sonotrode decreases with distance from the wave node as per the sine function. This means that the sonotrode in the $\lambda/2$ direction has much lower fatigue strength requirements. Absolute maximum stress values at sonotrode $\lambda/4$ depend mainly on the amplitude and density of the material (Roúca et al. Ultrasonic horns optimization; International Congress on Ultrasonics 2009) and exceed 400 MPa at high amplifications. Fatigue strength of most construction materials decreases as the temperature rises. The decrease is particularly significant after of homologous temperature (the ratio of working temperature to melting temperature). For example, the Ti6Al4V (ASTM grade 5) alloy reaches fatigue strength up to 600 MPa, which drops to below 100 MPa at temperatures over 1073 K. Similarly, in the case of tungsten alloys (Desimet), which reach up to 400 MPa of fatigue strength, the value drops to below 20 MPa at 1573 K.

Therefore, despite the existence of materials with high static strength in high temperatures, fatigue strength in this range is the main limitation in the ultrasound process. So far, the effective temperature limit of ultrasound systems, regardless of the cooling system or isolation, was about 1000 K, i.e. not much higher than aluminum melting point. System operation above this limit requires the use of expensive ceramic materials, such as silicon nitride or the use of a continuous sonotrode cooling system.

Providing a cooling system closer to the working tip of the sonotrode has made it possible to decrease the temperature in the part of the sonotrode most susceptible to damage. This was obtained at the expense of working conditions of the seal closer to the working tip. This seal is located at the antinode of the standing wave in the sonotrode body, which causes unfavorable working conditions. An expert not familiar with the present invention would conceivably not consider such a solution exactly due to the complex problem of ensuring adequate sealing.

Sonotrode body 104 is made of materials with a high ratio of tensile modulus to density, high fatigue strength and low acoustic loss. Typically, materials used in the state of the art are titanium or aluminum alloys. Considering the fact that the sonotrode material conducts heat from the working surface to the cooling liquid, materials with high thermal conductivity are particularly suited for this application. An expert in ultrasound materials would also be able to suggest other materials depending on the characteristics of the processed medium, for example tungsten or copper alloys.

Sonotrode body 104 according to the embodiment is made of aluminum PA7A alloy and has a length of 136 mm in a temperature of 297 K. It has an axially symmetric shape, beginning and ending in cylindrical shape. In the working temperature and during the process, standing wave node is located 70 mm from the working surface 205.

In the embodiment, the sonotrode body 204 shape was designed to obtain a stepped sonotrode in order to amplify the vibration amplitude four times, which is determined by the ratio of the base 104a surface area to the working surface 205. A change in sonotrode profile between the first and the second cylindrical part is made in such a way as to ensure the edge to be rounded to a radius of 10 mm.

An expert is capable of routinely suggesting different sonotrode profile changes, e.g. a sonotrode with logarithmic amplification, sonotrode without an axis of symmetry or with additional ribbing, depending on the particular needs and the selected material. Changes in sonotrode profile have a negligible impact on the location of the wave node. However, tests have shown that sonotrode wave node in the range of useful frequencies is usually within the range of half the length of the sonotrode and half the length of the sonotrode enlarged by 20 mm.

The first seal 106 is located at 70 mm from the working tip of the sonotrode, in the standing wave node. Therefore, it is not exposed to longitudinal vibrations.

At half sonotrode body 104 length, at the location of minimal longitudinal vibrations in the wave node, the first cooling system seal is placed. Tests have shown that within a distance less than 20 mm from the node, the vibration amplitude is low enough for typical static sealants to be used. This observation is particularly significant due to the fact that the location of the wave node depends on the sonotrode body 104 profile, as well as the temperate and temperature distribution in the body of the sonotrode. In the embodiment, the second seal is an o-ring compressed by the water jacket flange. An elastomeric o-ring is compressed around the sonotrode, creating a closing of the cooling system between the jacket 103 and the body 104.

Sonotrode body 104, on the surface 104a in direct contact with a transducer or a waveguide has an internal thread for the system assembly. Due to the presence of the cooling jacket 103 in the part of the sonotrode closer to the working surface 205, the surface in direct contact with the transducer 104a is heated only through mechanical losses in the system. Therefore, typical ultrasound state-of-the-art methods may be used for joining the parts and the conservation of the coupling.

In the present embodiment, the second seal located next to the working surface 205 is a polymer seal 207, integrated with a resilient element 208 at the end of the jacket 103 and tightened on the end of the sonotrode body 104, as shown in detail in FIG. 3. This ensures the simplicity of the system in case low amplitude ultrasounds and low cooling liquid pressure are used. There are also other possible solutions for sealing near the working chamber, discussed below in subsequent embodiment.

In FIG. 4a and FIG. 4b a sonotrode according to the second embodiment with the working tip 405, screwed in the sonotrode body 104, connected to diaphragm 407 containing a diaphragm resilient element 508, as shown in FIG. 5. Diaphragm 407 is pressed against the sonotrode body 104 with the working tip 405. Additionally, as shown in FIG. 5, the sonotrode can be equipped with a shield 510 of the diaphragm 407, protecting it from the sprayed material. An effective solution is to equip the jacket 103 with a plate and to use this plate to press the diaphragm 407 to the shield 510.

In an embodiment shown in FIGS. 4a and 4b, the sonotrode is equipped with a working tip screwed into the sonotrode body. The working tip may be made from the same material and a different material than the sonotrode body. In a preferable embodiment of the invention, the working tip is made from high-melting materials, such as tungsten or molybdenum alloys. The working tip can also act as an element pressing the seal against the sonotrode body, as shown in FIG. 5. After the working tip has undergone degradation, the diaphragm is also replaced, which ensures failure-free sealing. The mass of the working tip 405 preferably does not exceed 0.03 kg due to the system overload.

Diaphragm 407 could be made of various materials. In lower working temperatures, fluorinated technopolymer is recommended, e.g. Viton. In the case of higher temperatures, a metal diaphragm should be used, e.g. made of 316 steel. Preferably, the diaphragm is made of 0.5 mm thick Ampcoloy 95-copper based material with thermal conductivity above 100 W/mK and electrical conductivity above 20% IACS, and has a stiffness equal to or lower than 10 kN/mm in the axial direction of the ultrasound system. This allows for heat transfer from the working tip 405 to the cooling liquid to be increased. System sealing takes place directly at the place of contact of the working tip and the diaphragm. The use of an additional shield 510 is particularly recommended in higher working temperatures.

An alternative for the diaphragm 407 is the use of a stiff jacket seal 607, made from e.g. the same material as the body 104 and the cooling jacket and to ensure the presence of a flexible elastomer 608 between the seal and the end of the body 104, as shown in FIG. 6. After the additional shield 610 is used, the flexible elastomer 608 can be compressed between the seal 607 and the shield 610. The seal 607 constitutes a plate of the cooling jacket 103—in the present embodiment of the invention, the plate is 1 mm thick—the same as the other jacket walls. Compression is realized through a plate by cooling liquid pressure. Due to the low plate thickness, the system is flexible enough not to destroy the polymer seal in low ultrasound amplitude conditions, while simultaneously allowing for high cooling liquid pressure to be used.

Due to the interaction with the liquid material and the possibility of generation of additional ultrasound modes, vibrations in the body 104 of the sonotrode are not limited to the axial direction. Radial vibrations are also present. In such case, the location of the first seal next to the node of the base mode does not assure the lack of displacement of the body in relation to the cooling, jacket. This may lead to excessive wear of the first seal and/or leaks due to mechanical overload.

Therefore, in the present embodiment the sonotrode was provided with an elastic flange 712, which isolates the rest of the system from sonotrode body 104 vibrations. The flange is shown in detail in FIG. 7*a*. Flange 712 may be an element of the monolithic body—FIG. 7*a* or may be pressed on the sonotrode body FIG. 7*b*.

If the radial vibrations are low, an ordinary seal 706*c* may be used, as shown in FIG. 7*c*.

The sonotrode and its components may be made from different materials depending on the processed material type and the processing temperature. An embodiment illustrating the working principle of the sonotrode according to the invention and a method for metal homogenization was described below in relation to FIG. 8.

Sonotrode according to the embodiment shown in FIG. 8 works in a vacuum chamber as a component of ultrasound-assisted system for plasma melting of metals. A chamber according to the example is pumped out four times to an absolute pressure of 20 mbar, and then filled with 5.0 purity argon to an absolute pressure of 1200 mbar.

The body of the sonotrode 104 ensures amplitude amplification of 1:4 and is made of Grade 5 titanium alloy (Ti6Al4V). Is equipped with a thread 811.

The sonotrode is equipped with a working tip 805 made of technical grade tungsten. The working tip has a mass of 20 g and is made in the form of a M8 screw with a hexagonal head and a semicircular recess.

Working frequency in the temperature of 297 K of the sonotrode with the working tip was 20200 Hz. Working frequency is overstated due to thermal expansion of the sonotrode material in the working conditions. Between the working tip 805 and the body 104 of the sonotrode, a diaphragm 507 is placed, with a thickness of 0.8 mm made of Glidcop 60 material and containing a flexible part 508. Above the diaphragm, a diaphragm shield 510, made of 316 steel is placed. Diaphragm separates the cooling liquid 812 from the vacuum chamber.

In the present example, the cooling liquid is a mixture of ethylene glycol and water in 20:80 proportions, with a temperature of 15 degrees centigrade and liquid expenditure of 5 l/min. The addition of glycol restricts cavitation in the liquid and limits ultrasound power losses. Diaphragm 507 is sealed directly through pressing the working element 805 to the body 104 of the sonotrode and directly on the body of the cooling jacket.

Liquid metal 813 is melted via a plasma arc 815, sustained between a tungsten electrode 814 and the working element 805 and diaphragm 507, which simultaneously constitutes a connector electrode of the ultrasound system to the system sustaining arc discharge. In the example it is assumed to use direct current of 100 A applied for 30 s until a 3 g sample of Ti7Al6Nb alloy is melted. Amplitude at the working tip is 10 micrometers.

After the sample is melted, the plasma arc 815 is extinguished and the alloy melts with a simultaneous influence of the ultrasounds. This allows the prevention of dendritic structure forming and to obtain microstructure similar to recrystallized materials, i.e. equiaxial grains.

Person skilled in the art having learned the teachings of the description above will be able to suggest other materials and mechanical solutions for the seals, while maintaining the essence of the invention, which is to begin cooling of the sonotrode near the working tip or even at the very working tip location. An expert would easily notice that the proposed methods of embodiment of the first seal can be used for virtually every single described examples of embodiment of the invention.

An expert would be easily able to scale the sonotrode as per the embodiment to a different working frequency, as well as to suggest mechanical vibration sources, particularly ultrasounds.

The invention claimed is:

1. A sonotrode, comprising:
    a first end adapted to be connected to a mechanical vibrations source,
    a working tip for spraying a hot material at an opposite end of the sonotrode, and
    a body with a cooling jacket, sealed with a first seal and a second seal,
    wherein the first seal is placed in a proximity of a location of the node of the standing wave excited in the sonotrode in its working condition,
    wherein the second seal is at a place of contact with the body of the sonotrode place near the antinode of a standing wave in the body of the sonotrode closer to the working tip than the first seal, wherein the second seal is equipped with a resilient element and a shield for protecting resilient element from the hot sprayed material, and wherein the resilient element is an elastomer.

2. The sonotrode according to claim 1, wherein the working tip is the working surface of the body of the sonotrode.

3. The sonotrode according to claim 1, wherein the working tip is an element detachably connected to the sonotrode.

4. The sonotrode according to claim 1, wherein the second seal is a polymer seal integrated with a metal resilient element.

5. The sonotrode according to claim 1, characterized in that the second seal is a diaphragm connected with the working tip.

6. The sonotrode according to claim 5, wherein the diaphragm is made of a material having thermal conductivity above 100 W/mK.

7. The sonotrode according to claim 6, wherein the diaphragm is made of a material with electrical conductivity above 20% IACS and the diaphragm has stiffness lower or equal to 10 kN/mm in axial direction of the ultrasound system.

8. The sonotrode according to claim 1, wherein the first seal is an elastomeric o-ring.

9. The sonotrode according to claim 1, wherein the body is fitted with a resilient flange near the first seal.

10. A method for metal processing comprising:
providing a sonotrode as defined in claim 1, and
melting the metal on the working tip of the sonotrode, excited to mechanically vibrate.

11. The method according to claim 10, wherein mechanical vibrations within a frequency range of 16 to 400 kHz are used.

12. The method according to claim 10, wherein during the melting the sonotrode is placed in a vacuum chamber filled with argon.

13. The method according to claim 10, wherein:
the second seal of the sonotrode is a diaphragm connected with the working tip, and
the melting is carried out with electrical current flow via electrical conduction with the diaphragm acting as electric connector.

14. The method according to claim 11, further comprising cooling the sonotrode with a cooling fluid containing ethylene glycol.

15. The method according to claim 11, further comprising cooling the sonotrode with a cooling fluid containing oil mist.

\* \* \* \* \*